(12) United States Patent
Itoh

(10) Patent No.: US 10,421,417 B2
(45) Date of Patent: Sep. 24, 2019

(54) BELT MOLDING ATTACHMENT STRUCTURE

(71) Applicant: TOYOTA JIDOSHA KABUSHIKI KAISHA, Toyota-shi (JP)

(72) Inventor: Daisuke Itoh, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/839,153

(22) Filed: Dec. 12, 2017

(65) Prior Publication Data

US 2018/0170285 A1 Jun. 21, 2018

(30) Foreign Application Priority Data

Dec. 15, 2016 (JP) ................ 2016-243493

(51) Int. Cl.
*B60J 10/22* (2016.01)
*B60R 13/06* (2006.01)
(Continued)

(52) U.S. Cl.
CPC ............... *B60R 13/06* (2013.01); *B60J 10/22* (2016.02); *B60J 10/32* (2016.02); *B60J 10/75* (2016.02); *B60R 13/04* (2013.01)

(58) Field of Classification Search
CPC ... B60J 10/24; B60J 10/84; B60J 10/86; B60J 10/80; B60J 5/0479; B60J 10/32; B60J 5/06; B60J 10/30; B60R 13/04; B60R 13/06; B60R 16/0215; B60R 13/0237; B60R 13/0243; B60R 2013/0287; B60R 3/02
(Continued)

(56) References Cited

U.S. PATENT DOCUMENTS 7,390,050 B2 * 6/2008 Nakao .................... B60R 13/04
296/146.1
8,001,727 B2 * 8/2011 Ho .................... B29C 45/14467
49/374
(Continued)

FOREIGN PATENT DOCUMENTS

JP 2002-219935 8/2002
JP 2005-254914 A 9/2005
(Continued)

*Primary Examiner* — D Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A belt molding attachment structure includes an outer panel and a belt molding. The belt molding includes a main body part, an end member, and a weather strip. The main body part has a U-shaped cross-section. The end member is attached to an end part of the main body part, and includes a locking part on a lower side. The weather strip protrudes toward a vehicle width center side in a vehicle width direction from the main body part. The outer panel includes a flat part. The locking part includes a tip part, is configured to be elastically deformed in the extending direction of the main body part, and is adjacent to at least one of edges of the flat part in the extending direction of the main body part. The tip part of the locking part abuts against a lower surface of the flat part.

5 Claims, 5 Drawing Sheets

(51) Int. Cl.
*B60J 10/32* (2016.01)
*B60J 10/75* (2016.01)
*B60R 13/04* (2006.01)

(58) Field of Classification Search
USPC ......... 296/146.9, 146.6, 202, 155, 209, 199, 296/204, 210, 97.22; 49/475.1, 490.1, 49/504, 168, 355, 460, 358; 292/1, 216, 292/340, 341.15
See application file for complete search history.

(56) References Cited

U.S. PATENT DOCUMENTS

| | | | | |
|---|---|---|---|---|
| 8,104,227 B2* | 1/2012 | Tamura | ................... | B60J 10/18 49/377 |
| 8,714,624 B2* | 5/2014 | Fukui | ...................... | B60R 13/04 296/146.1 |
| 9,090,152 B2* | 7/2015 | Yoshimoto | ............... | B60J 10/75 |
| 9,091,114 B2* | 7/2015 | Franzen | ................. | F16B 5/121 |

FOREIGN PATENT DOCUMENTS

| | | |
|---|---|---|
| JP | 2007-131016 | 5/2007 |
| JP | 2014-91503 | 5/2014 |

* cited by examiner

BELT MOLDING ATTACHMENT STRUCTURE

INCORPORATION BY REFERENCE

The disclosure of Japanese Patent Application No. 2016-243493 filed on Dec. 15, 2016 including the specification, drawings and abstract is incorporated herein by reference in its entirety.

BACKGROUND

1. Technical Field

The present disclosure relates to a belt molding attachment structure.

2. Description of Related Art

In a vehicular door described in Japanese Unexamined Patent Application Publication No. 2014-091503 (JP 2014-091503 A), a door panel is constituted of an inner panel that is located on an inside in a vehicle width direction, and an outer panel that is located on an outside in the vehicle width direction. A door frame that constitutes a window frame is connected to an upper part of the door panel. Additionally, the vehicular door includes a windowpane accommodated between the inner panel and the outer panel. The windowpane is capable of being lifted and lowered within the limits of a door frame. A belt molding that extends along an extending direction of an upper end part of the outer panel is attached to the upper end part thereof. The belt molding includes a main body part having a substantially U-shaped cross-section, and the main body part clamps the upper end part of the outer panel from both sides in the vehicle width direction. Additionally, the belt molding includes a weather strip that extends toward the inside in the vehicle width direction from the main body part and abuts against the windowpane.

SUMMARY

In a case where the windowpane is lifted in the vehicular door described in JP 2014-091503 A, an upward force acts on the belt molding due to sliding contact between the windowpane and the weather strip. When the upward force acts, there is a possibility that the belt molding deviates upward with respect to the upper end part of the outer panel or the belt molding comes off upward from the upper end part of the outer panel.

An aspect of the present disclosure relates to a belt molding attachment structure including an outer panel that is a panel located on a side far from a vehicle width center of a vehicular door in a vehicle width direction, and a belt molding that is attached to the outer panel. The belt molding extends along an upper end part of the outer panel. The belt molding includes a main body part, an end member, and a weather strip. The main body part has a U-shaped cross-section that clamps the upper end part of the outer panel from both sides in the vehicle width direction. The end member is attached to an end part of the main body part in an extending direction of the main body part. The weather strip protrudes toward a vehicle width center side in the vehicle width direction from the main body part. The outer panel includes a plate-shaped flat part that extends inward toward the vehicle width center side in the vehicle width direction further than the upper end part of the outer panel and is located below the end member in a vehicle upward-downward direction. The end member includes a locking part on a lower side in the vehicle upward-downward direction. The locking part includes a hook-shaped tip part that protrudes in the extending direction of the main body part. The locking part is configured to be elastically deformed in the extending direction of the main body part. The locking part is adjacent to at least one of edges of the flat part in the extending directions of the main body part, and the tip part of the locking part abuts against a lower surface of the flat part.

According to the aspect of the present disclosure, when the belt molding is attached to the outer panel from above, the tip part of the locking part of the end member in the belt molding abuts against the edge of the flat part in the outer panel, and the locking part is elastically deformed in the extending direction of the main body part. Then, the belt molding is attached to the outer panel as the locking part returns elastically and abuts against the lower surface of the flat part of the outer panel. In a case where a windowpane is lifted in a state where the belt molding is attached to the outer panel as described above, even when an upward force tends to act on the belt molding from the inside near the vehicle width center in the vehicle width direction and the belt molding tends to rotate, an elastic force opposite to the force of the belt molding to rotate is generated in the locking part due to a locking relationship in which the tip part of the locking part abuts against the lower surface of the flat part of the outer panel. Then, the force with which the belt molding tends to rotate is received by the flat part of the outer panel. As described above, the belt molding can be prevented from deviating upward or coming off upward.

In belt molding attachment structure according to the aspect of the present disclosure, the end member may include a shaft part that extends in the extending direction of the main body part. The locking part may protrude from the shaft part. The shaft part may be clamped by the end part of the main body part. The main body part may include a lower lip that protrudes downward in the vehicle upward-downward direction from a lower end of the end part of the main body part on a side far from the vehicle width center. The lower lip may abut against a surface of the outer panel on the side far from the vehicle width center in the vehicle width direction.

In the aspect of the present disclosure, the end part of the main body part clamps the shaft part of the end member, and does not clamp the upper end part of the outer panel. In the above-described respect, it can be said that the stability of attachment of the end part of the main body part to the outer panel is relatively low. According to the aspect of the present disclosure, the lower lip at the end part of the main body part abuts against the surface of the outer panel on the outside far from the vehicle width center in the vehicle width direction. Additionally, the locking part in the end member attached to the end part of the main body part abuts against the lower surface of the flat part. Due to the above-described abutment relationship, the belt molding can abut against the outer panel from both sides in a thickness direction even at the end part of the belt molding. Hence, as compared to a case where the belt molding abuts solely against one surface (the lower surface of the flat part) of the outer panel, the belt molding can be firmly attached, and the positional deviation or coming-off of the belt molding can be more appropriately suppressed.

In belt molding attachment structure according to the aspect of the present disclosure, the locking part may include a first extending part and a second extending part. The first extending part may protrude downward in the vehicle upward-downward direction. The second extending part may protrude obliquely upward in the extending direction of the main body part toward a lower surface of the flat part in the vehicle upward-downward direction from a lower end of the first extending part in the vehicle upward-downward direction. A tip part of the second extending part may abut against the lower surface of the flat part in the vehicle upward-downward direction.

According to the aspect of the present disclosure, by making the edge of the flat part and the lower surface of the second extending part abut against each other when the belt molding is attached from above, the second extending part can be elastically deformed in the extending direction of the main body part with the lower end of the first extending part in the locking part as a fulcrum. Since, the locking part can be simply elastically deformed, utilizing a force for moving the belt molding downward when an attempt to attach the belt molding is made as described above, the attachment work of the belt molding does not become easily complicated than before.

In belt molding attachment structure according to the aspect of the present disclosure, the second extending part may include a protrusion that protrudes upward in the vehicle upward-downward direction further than a location of abutment against the flat part. The protrusion may protrude upward of an upper surface of the flat part in the vehicle upward-downward direction.

According to the aspect of the present disclosure, the protrusion of the second extending part protrudes upward of the upper surface of the flat part of the outer panel in the vehicle upward-downward direction. For that reason, for example, a plate-shaped tool is inserted between the outer panel and the main body part of the belt molding, so that the protrusion of the second extending part can be moved to the first extending part side (a side opposite to the flat part). As described above, the abutment relationship between the tip part of the second extending part and the lower surface of the flat part can be released by elastically deforming the second extending part to the first extending part side.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
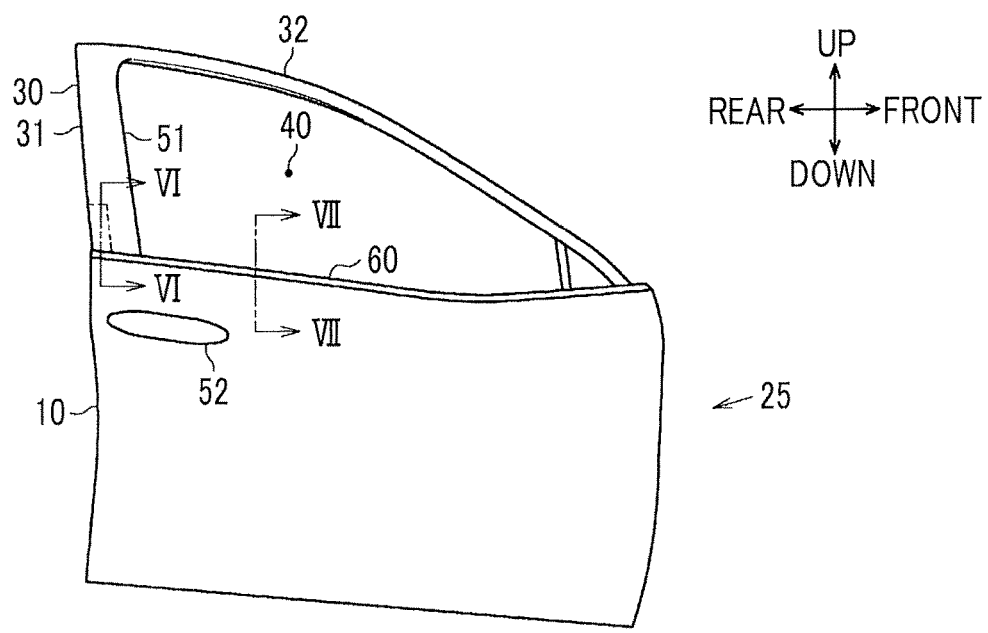
FIG. 1 is a front view of a front door to which a belt molding attachment structure is applied.

Hereinafter, an embodiment of a belt molding attachment structure of the present disclosure will be described taking a front door on the right side of a vehicle as an example. As illustrated in FIG. 1, a vehicular front door includes a door panel 25, which is constituted of a plate-shaped inner panel (not illustrated) located on an inside (a paper back side in FIG. 1) near a vehicle width center in a vehicle width direction and a plate-shaped outer panel 10 located on an outside (a paper front side in FIG. 1) far from the vehicle width center in the vehicle width direction. The outer panel 10 has an oblong plate shape as a whole. A door knob 52 for opening and closing the front door is attached to a rear side on an outer surface of the outer panel 10. The inner panel has almost the same oblong plate shape as the outer panel 10, and is arranged to face the outer panel 10. A front edge of the outer panel 10 is connected to a front edge of the inner panel. Additionally, a lower edge of the outer panel 10 is connected to a lower edge of the inner panel. A rear edge of the outer panel 10 is connected to a rear edge of the inner panel. A windowpane 40, or an accommodation space for accommodating a drive device and the like for lifting and lowering the windowpane 40 is provided between the outer panel 10 and the inner panel.

Figure 2:
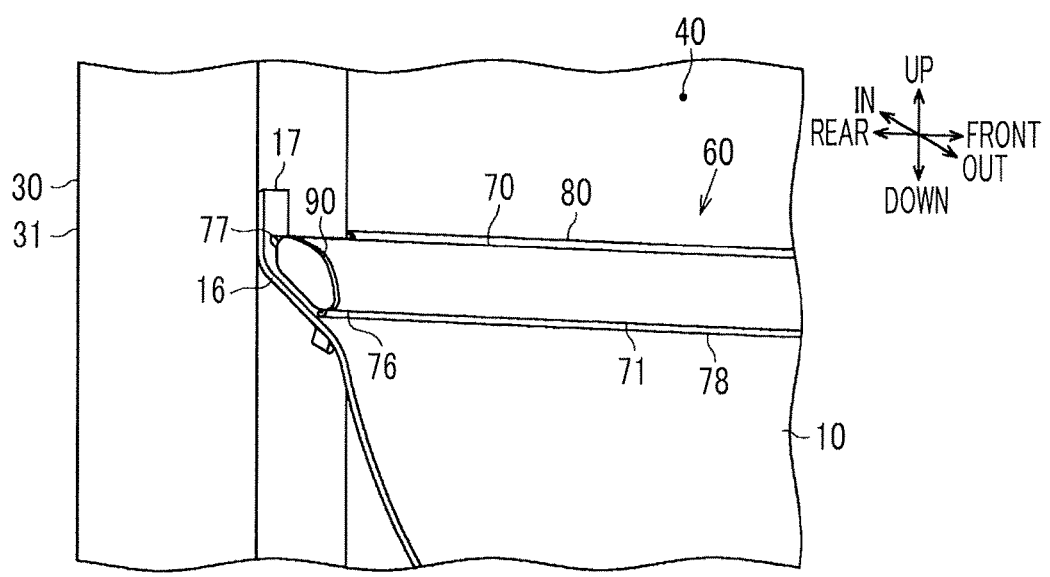
FIG. 2 is a partially enlarged perspective view of a front door in FIG. 1.

As illustrated in FIG. 1 and FIG. 2, a back frame 31 protrudes upward from a rear end of an upper edge of a door panel 25. A portion of a lower side of the back frame 31 is sandwiched between the outer panel 10 and the inner panel and is fixed to inner surfaces of these panels. An upper frame 32 that extends forward is connected to an upper end of the back frame 31. The upper frame 32 is inclined so as to be located closer to a lower side as being closer to a front side. A front end of the upper frame 32 reaches a front end of the upper edge of the door panel 25. A portion on a front side of the upper frame 32 is sandwiched between the outer panel 10 and the inner panel and is fixed to the inner surfaces of these panels. A door frame 30 is constituted of the back frame 31 and the upper frame 32. Additionally, as illustrated in FIG. 1, a plate-shaped garnish 51 is attached to the outside of the back frame 31 far from the vehicle width center in the vehicle width direction so as to cover the back frame 31. In addition, the illustration of the garnish 51 is omitted in FIG. 2.

The plate-shaped windowpane 40 is accommodated in the accommodation space between the outer panel 10 and the inner panel. Since the windowpane 40 has a shape according to the frame shape of the door frame 30 in a plan view, the dimension thereof in an upward-downward direction becomes gradually smaller forward. The windowpane 40 is capable of being lifted and lowered within the limits of the door frame 30 by an electric drive device accommodated in the accommodation space between the outer panel 10 and an inner panel.

Figure 3:
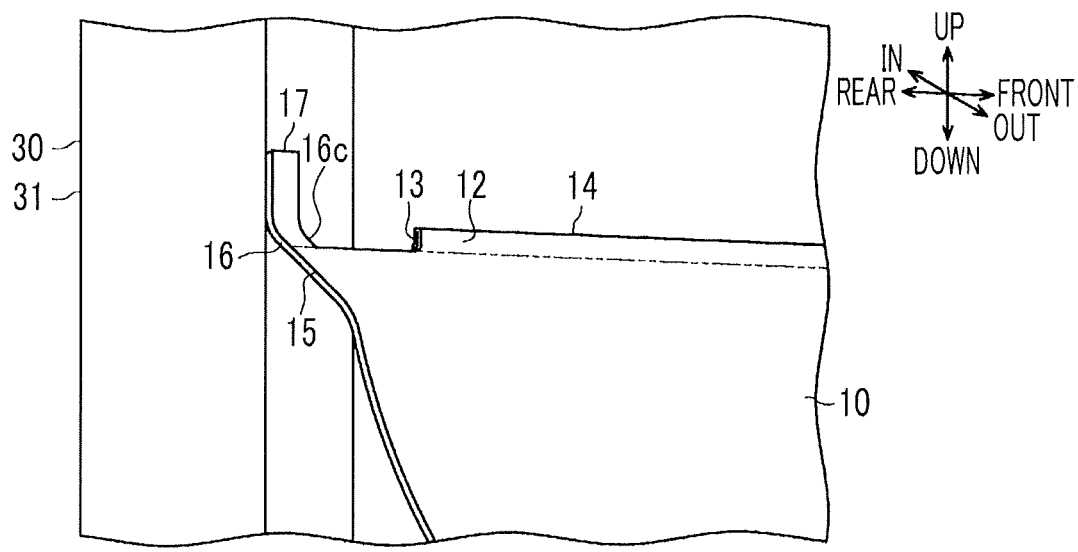
FIG. 3 is a perspective view illustrating a state where a belt molding is detached in FIG. 2.

As illustrated in FIG. 3, the outer panel 10 includes a panel body part 15 that is curved in the upward-downward direction such that a substantial center in the upward-downward direction is located on the outside far from the vehicle width center in the vehicle width direction, and an attachment end part 14 that extends upward from an upper edge (virtually indicated by a two-dot chain line in FIG. 3.) of the panel body part 15. The attachment end part 14 is provided at a central part of the upper edge of the panel body part 15 excluding both end parts thereof in a vehicle forward-rearward direction. Additionally, a rear end of the attachment end part 14 is located in front of a front end of the back frame 31 in the vehicle forward-rearward direction.

Figure 7:
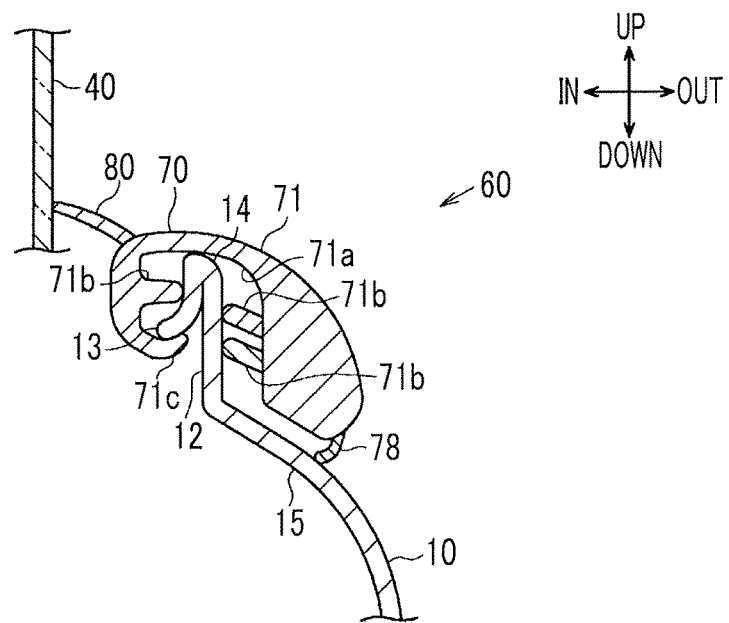
FIG. 7 is a sectional view taken along line VII-VII in FIG. 1.

As illustrated in FIG. 7, the attachment end part 14 of the outer panel 10 includes an upwardly extending part 12 that perpendicularly extends upward from the upper edge of the panel body part 15, and a downwardly extending part 13 that is folded inward toward the vehicle width center in the vehicle width direction from an upper end of the upwardly extending part 12 and extends downward. A lower end of the downwardly extending part 13 is curved inward toward the vehicle width center in the vehicle width direction.

Figure 6:
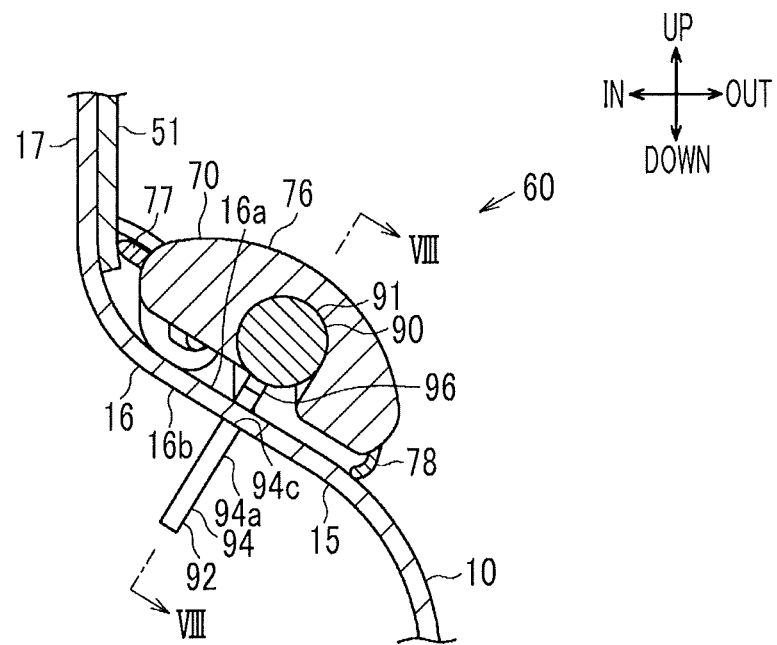
FIG. 6 is a sectional view taken along line VI-VI in FIG. 1.

As illustrated in FIG. 3, a flat part 16 extends toward the inside closer to the vehicle width center in the vehicle width direction than the attachment end part 14 from a rear end part of the upper edge of the panel body part 15. That is, as illustrated in FIG. 6, the flat part 16 extends so as to be closer to the horizontal than the attachment end part 14, and a substantially entire flat part is located below the attachment end part 14. As illustrated in FIG. 3, a front edge 16c of the flat part 16 is located behind a front edge of the back frame 31, and is spaced apart from a rear edge of the attachment end part 14. A connecting part 17 extends upward from the edge of the flat part 16 on the inside near the vehicle width center in the vehicle width direction. The connecting part 17 is connected to a surface of the back frame 31 on the outside far from the vehicle width center in the vehicle width direction.

Figure 4:
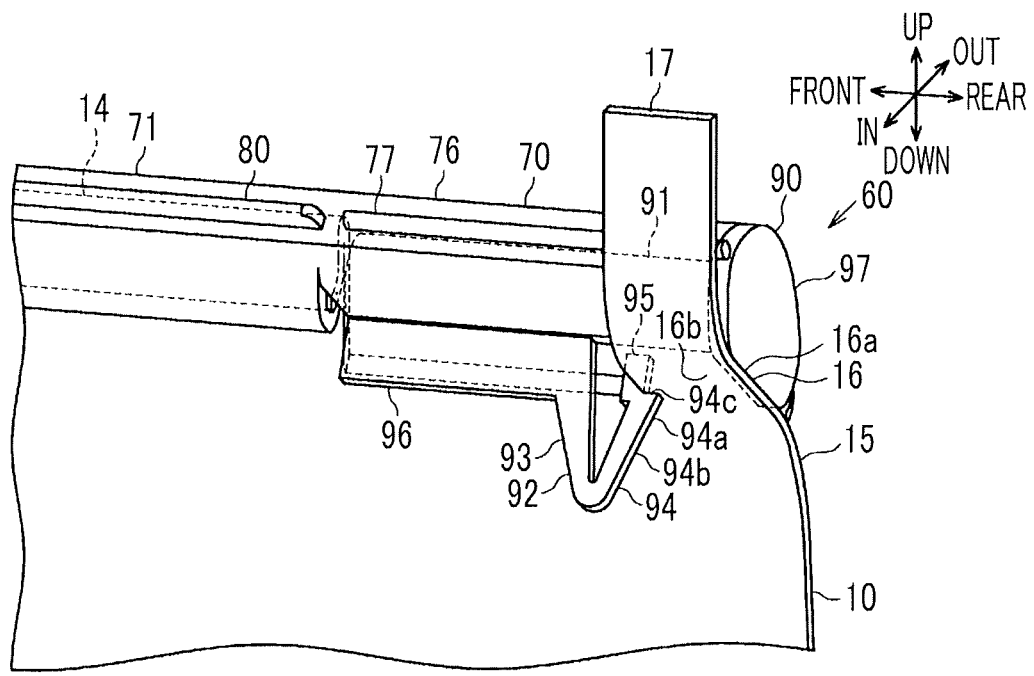
FIG. 4 is a perspective view of the front door in FIG. 2 as viewed from an inside near a vehicle width center in a vehicle width direction.

As illustrated in FIG. 4, a belt molding 60 having a rod shape as a whole is attached to the attachment end part 14 of the outer panel 10. The belt molding 60 includes a main body part 70 that is configured to have a substantially U-shaped cross-section and extends in the vehicle forward-rearward direction. Moreover, the main body part 70 can be roughly divided into a rear end part 76 that is a portion on a rear end side in the vehicle forward-rearward direction, and a clamping part 71 in front of the rear end part 76.

As illustrated in FIG. 7, the clamping part 71 of the main body part 70 has a substantially U-shaped cross-section that opens downward, as a whole. A plurality of projections 71b protrudes inward from an inner surface 71a of the clamping part 71. A locking projection 71c protrudes toward the outside far from the vehicle width center in the vehicle width direction from a lower end of the clamping part 71 on the inside near the vehicle width center in the vehicle width direction. The clamping part 71 in the main body part 70 clamps the attachment end part 14 of the outer panel 10 from both sides in the vehicle width direction, and the projections 71b in the clamping part 71 abut against the upwardly extending part 12 or the downwardly extending part 13 in the attachment end part 14. Additionally, the locking projection 71c is locked to a lower end of the downwardly extending part 13. In addition, in the present embodiment, the attachment end part 14 of the outer panel 10 clamped by the main body part 70 of the belt molding 60 is equivalent to an "upper end part" of the outer panel 10.

As illustrated in FIG. 2 and FIG. 7, the belt molding 60 includes a weather strip 80 that protrudes obliquely upward toward the vehicle width center in the vehicle width direction from an outer surface of the clamping part 71 on the inside near the vehicle width center in the vehicle width direction. The weather strip 80 is formed over the entire clamping part 71 in the vehicle forward-rearward direction. A tip part of the weather strip 80 abuts against a surface of the windowpane 40 on the outside far from the vehicle width center in the vehicle width direction.

As illustrated in FIG. 6, the rear end part 76 of the main body part 70 has a substantially U-shaped cross-section that opens downward. In the rear end part 76, a U-shaped internal space is smaller than the clamping part 71, and the U-shaped internal space has a substantially circular shape when viewed in a sectional view in a direction orthogonal to the vehicle forward-rearward direction. An outer shape of the clamping part 71 and an outer shape of the rear end part 76 are the same, and an outer surface of the clamping part 71 and an outer surface of the rear end part 76 are flush surfaces without a step.

As illustrated in FIG. 2 and FIG. 6, the main body part 70 includes an upper lip 77 that obliquely upward protrudes inward toward the vehicle width center in the vehicle width direction from an outer surface of the rear end part 76 on the inside near the vehicle width center in the vehicle width direction. The upper lip 77 is formed over the entire rear end part 76 in the vehicle forward-rearward direction. A tip part of the upper lip 77 abuts against a surface of the garnish 51 on the outside far from the vehicle width center in the vehicle width direction.

The main body part 70 includes a lower lip 78 that protrudes downward in the vehicle upward-downward direction from a lower end of an end part on a side far from the vehicle width center outside the clamping part 71 and the rear end part 76 in the vehicle width direction. The lower lip 78 extends over the entire clamping part 71 and the entire rear end part 76 in the vehicle forward-rearward direction. The lower lip 78 abuts against a surface (upper surface) of the panel body part 15 of the outer panel 10 on the outside far from the vehicle width center in the vehicle width direction.

Figure 5:
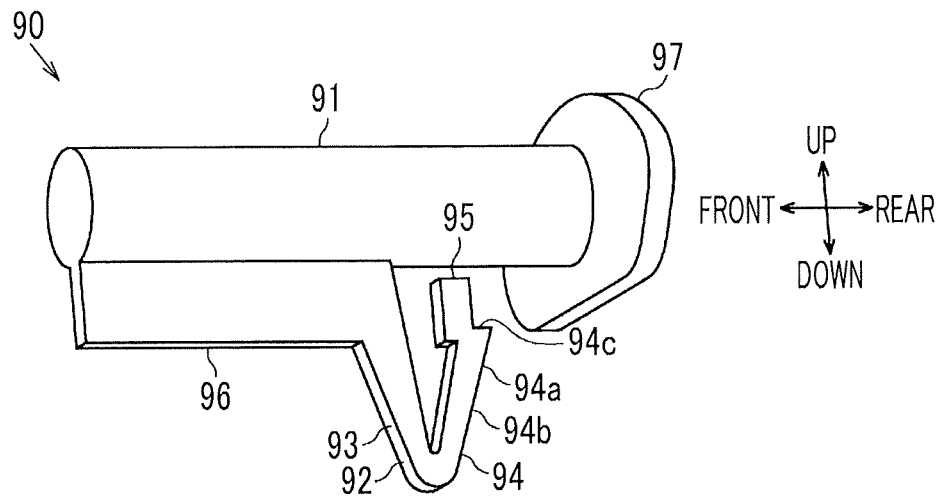
FIG. 5 is a perspective view of an end member.
Figure 8:
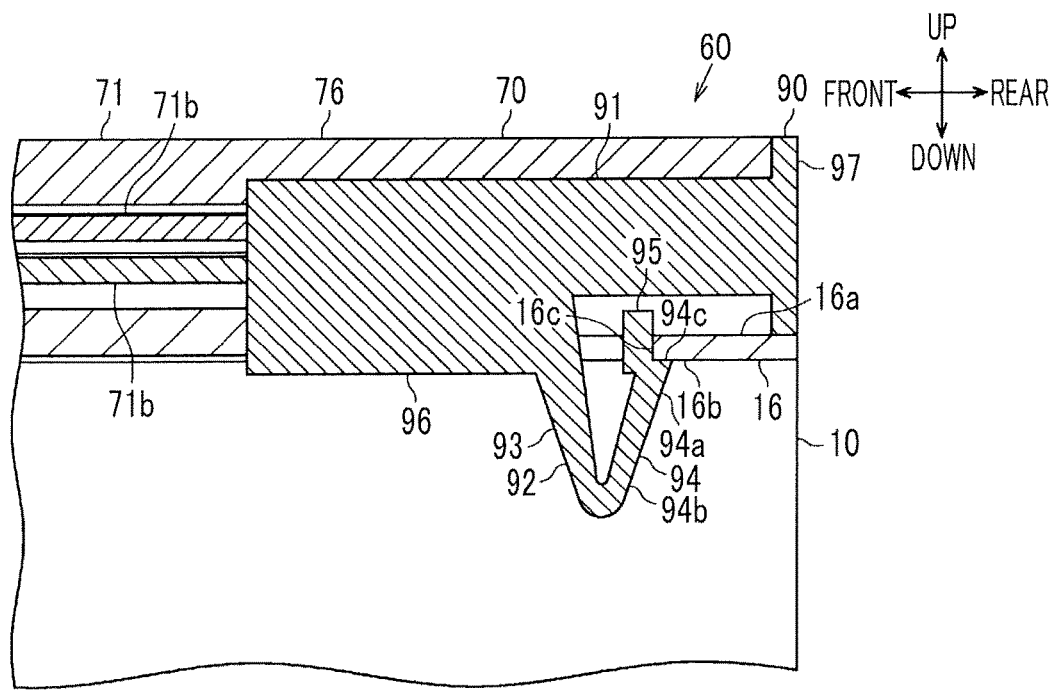
FIG. 8 is a sectional view taken along line VIII-VIII in FIG. 6.

As illustrated in FIG. 4 and FIG. 8, an end member 90 is attached to the rear end part 76 of the main body part 70. As illustrated in FIG. 5, the end member 90 includes a shaft part 91 that extends in the vehicle forward-rearward direction, and a plate-shaped lid part 97 that is connected to a rear end surface of the shaft part 91. The shaft part 91 has a substantially columnar shape, and the external diameter of the shaft part 91 is the same as an inside dimension (internal diameter) of the U-shape of the rear end part 76 in the main body part 70. As illustrated in FIG. 6, the shaft part 91 of the end member 90 is clamped by the rear end part 76 of the main body part 70. Additionally, a planar shape (a shape when viewed from a vehicle rear side) of the lid part 97 is almost the same as an outer shape of the rear end part 76 in a cross-section orthogonal to the vehicle forward-rearward direction. A surface of the lid part 97 on the front side abuts against a rear end surface of the rear end part 76 of the main body part 70.

As illustrated in FIG. 5, the end member 90 includes a plate-shaped restricting part 96 that protrudes downward from the shaft part 91 and extends in the vehicle forward-rearward direction. The restricting part 96 extends from a front end of the shaft part 91 to substantial center of the shaft part 91. As illustrated in FIG. 6, the restricting part 96 protrudes downward from a U-shaped opening of the rear end part 76 in the main body part 70. A surface of the restricting part 96 on the outside far from the vehicle width center in the vehicle width direction abuts against an upper edge (a portion between the attachment end part 14 and the flat part 16) of the panel body part 15.

As illustrated in FIG. 5, the end member 90 includes a locking part 92 that protrudes downward from the shaft part 91 behind the restricting part 96 and that is formed in a hook shape as a whole. In addition, in the present embodiment, the restricting part 96 and the locking part 92 are continuously integrated with each other. The locking part 92 includes a quadrangular prismatic first extending part 93 that protrudes obliquely rearward toward the lower side, and a quadrangular prismatic second extending part 94 that protrudes obliquely upward and rearward from a lower end of the first extending part 93. That is, the first extending part 93 and the second extending part 94 have a substantial V-shape as a whole. A lower surface of the second extending part 94 forms an inclined surface 94b located closer to the upper side as it moves to the rear side. As illustrated in FIG. 8, a rear portion of an upper surface 94c of a tip part 94a of the second extending part 94 is a flat surface, and abuts against a lower surface 16b of the flat part 16 in the outer panel 10. In addition, in the locking part 92, the second extending part 94 is elastically deformable in the vehicle forward-rearward direction (an extending direction of the main body part 70) with a lower end of the first extending part 93 as a fulcrum.

As illustrated in FIG. 8, a protrusion 95 protrudes from a front portion of the upper surface 94c of the tip part 94a in the second extending part 94. The protrusion 95 sticks out upward of an upper surface 16a of the flat part 16 in the outer panel 10. The protrusion 95 abuts against the front edge 16c of the flat part 16 in the outer panel 10.

In addition, the locking part 92 is located in front of the front edge 16c of the flat part 16 in the outer panel 10. Also, the locking part 92 and the front edge 16c of the flat part 16 abut against each other, and another member is not interposed between the locking part 92 and the front edge 16c of the flat part 16. That is, the locking part 92 and the front edge 16c of the flat part 16 are adjacent to each other.

Figure 9:
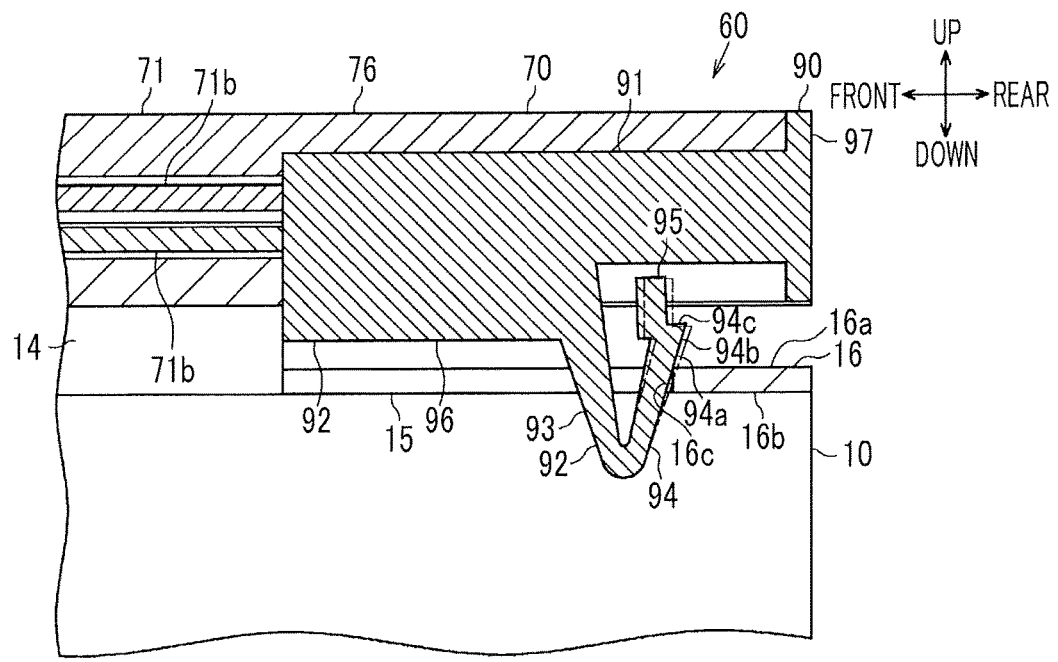
FIG. 9 is an explanatory view illustrating a method of attaching the belt molding.

Next, a method of attaching the belt molding 60 to the outer panel 10 by an operator will be described with reference to FIG. 9. As illustrated in FIG. 9, first of all, the belt molding 60 is disposed above the attachment end part 14 and the flat part 16 of the outer panel 10. The belt molding 60 is moved downward from the above-described arrangement position, and the inclined surface 94b of the second extending part 94 in the locking part 92 is made to abut against the front edge 16c of the flat part 16 of the outer panel 10. By further moving the belt molding 60 downward from the above-described state, the second extending part 94 of the locking part 92 is elastically deformed forward with the lower end of the first extending part 93 as a fulcrum.

Moreover, when the belt molding 60 is moved downward and the tip part 94a of the second extending part 94 moves to a position lower than the lower surface 16b of the flat part 16, the locking part 92 returns elastically. In this case, the upper surface 94c of the tip part 94a of the second extending part 94 is located directly below the lower surface 16b of the flat part 16, and the protrusion 95 of the locking part 92 abuts against the front edge 16c of the flat part 16.

When the belt molding 60 is attached to the outer panel 10 as mentioned above, as illustrated in FIG. 6 and FIG. 7, the lower lip 78 of the main body part 70 of the belt molding 60 abuts against a surface (upper surface) of the panel body part 15 of the outer panel 10 on the outside far from the vehicle width center in the vehicle width direction. Additionally, the lower lip 78 is elastically deformed so as to be compressed in the upward-downward direction to some extent. For that reason, in a state where the belt molding 60 is attached to the outer panel 10, an upward force is generated in the main body part 70 such that the lower lip 78 returns elastically. Also, an upward force also acts on the end member 90 attached to the rear end part 76 in the main body part 70. As a result, as illustrated in FIG. 8, the upper surface 94c of the locking part 92 in the end member 90 and the lower surface 16b of the flat part 16 in the outer panel 10 abut against each other.

Figure 10:
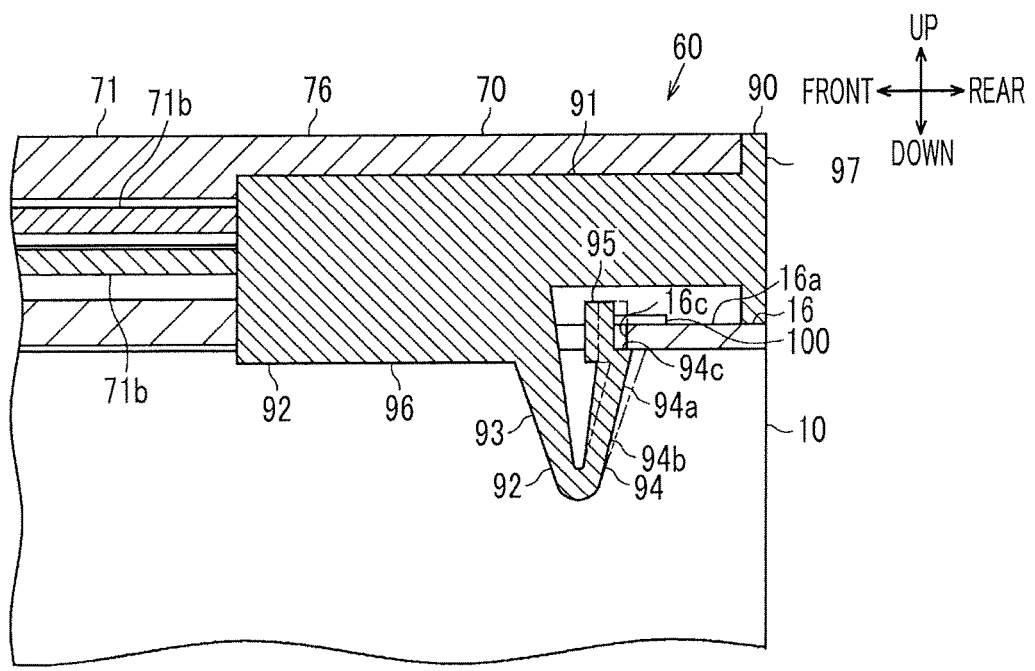
FIG. 10 is an explanatory view illustrating a method of detaching the belt molding.

Next, a method of detaching the belt molding 60 from the outer panel 10 by the operator will be described with reference to FIG. 10. As illustrated in FIG. 10, when the belt molding 60 is detached from the outer panel 10, first of all, a plate-shaped tool 100 is inserted inward toward near the vehicle width center in the vehicle width direction from between a surface (upper surface) of the panel body part 15 of the outer panel 10 on the side far from a vehicle width center in the vehicle width direction and the lower lip 78 of the main body part 70 of the belt molding 60. Then, the tool 100 is located between the shaft part 91 of the end member 90 and the upper surface 16a of the flat part 16. Thereafter, by making the tool 100 abut against a rear end surface of the protrusion 95 of the locking part 92 and by further moving the tool 100 forward, the protrusion 95 of the locking part 92 is moved forward. Then, by moving the entire tip part 94a of the second extending part 94 in the locking part 92 further forward than the flat part 16, an abutment relationship between the tip part 94a of the second extending part 94 and the lower surface 16b of the flat part 16 is released, so that the belt molding 60 can be detached upward.

According to the present embodiment, the following effects can be exhibited. As illustrated in FIG. 7, in the front door of the present embodiment, the windowpane 40 and the weather strip 80 of the belt molding 60 abut against each other. For that reason, in a case where the windowpane 40 is lifted, an upward force acts on the weather strip 80 due to the sliding contact between the windowpane 40 and the weather strip 80. Along with this, the upward force also acts on the main body part 70 of the belt molding 60 on the inside near the vehicle width center in the vehicle width direction. When the above force acts, there is a possibility that the belt molding 60 rotates and deviates upward with respect to the attachment end part 14 of the outer panel 10 or the belt molding 60 comes off upward from the attachment end part 14 of the outer panel 10. Additionally, even in a case where a driver or the like touches the belt molding 60 and the upward force acts on the main body part 70 of the belt molding 60, similarly, the belt molding 60 may deviate or may come off.

As illustrated in FIG. 8, in the present embodiment, the tip part 94a of the locking part 92 in the belt molding 60 abuts against the lower surface 16b of the flat part 16 of the outer panel 10. An elastic force opposite to the force of the belt molding 60 to rotate is generated in the locking part 92 due to the above-described locking relationship between the belt molding 60 and the outer panel 10. Then, the force with which the belt molding 60 tends to rotate is received by the flat part 16 of the outer panel 10. Accordingly, the belt molding 60 can be prevented from deviating upward or coming off upward.

Meanwhile, as illustrated in FIG. 6, in the present embodiment, the shaft part 91 of the end member 90 is clamped by the rear end part 76 of the main body part 70 in the belt molding 60, and the attachment end part 14 of the outer panel 10 is not clamped. Hence, in that respect, it can be said that the stability of attachment of the rear end part 76 of the main body part 70 in the belt molding 60 to the outer panel 10 is relatively low. On the other hand, in the present embodiment, the rear end part 76 in the main body part 70 is provided with the lower lip 78, and the lower lip 78 abuts against the surface (upper surface) of the panel body part 15 of the outer panel 10 on the side far from the vehicle width center in the vehicle width direction. Additionally, the locking part 92 in the end member 90 attached to the rear end part 76 of the main body part 70 abuts against the lower surface 16b of the flat part 16. That is, a rear end part of the belt molding 60 where the rear end part 76 is located abuts against the upper surface and the lower surface of the outer panel 10. Due to the above-described abutment relationship, the belt molding 60 can abut against the outer panel 10 from both sides in a thickness direction even at the rear end part provided with the rear end part 76. Hence, as compared to a case where the belt molding 60 abuts solely against one surface (the lower surface 16b of the flat part 16) of the outer panel 10, the belt molding 60 can be firmly attached, and the positional deviation or coming-off of the belt molding 60 can be more appropriately suppressed.

Meanwhile, it is assumed that the locking part 92 of the belt molding 60 is elastically deformed to the side far from the vehicle width center in the vehicle width direction orthogonal to the extending direction of the main body part 70. In the case, when the belt molding 60 is attached to the outer panel 10, the locking part 92 is elastically deformed to the side far from the vehicle width center in the vehicle width direction orthogonal to the extending direction of the main body part 70 in the belt molding 60. In the case, since a reaction force accompanying the elastic deformation of the locking part 92 acts on the main body part 70 in the direction orthogonal to the extending direction of the main body part 70, the main body part 70 is elastically deformed relatively largely. Also, even when the belt molding 60 is attached to the outer panel 10 and the locking part 92 returns elastically, the main body part 70 may not elastically return to its original state, or bending or the like of the main body part 70 may not be eliminated. As a result, a gap may be relatively easily formed between the surface of the outer panel 10 on the side far from the vehicle width center in the vehicle width direction, and the belt molding 60.

In contrast to the above, in the present embodiment, when the belt molding 60 is attached to the outer panel 10, the locking part 92 of the belt molding 60 is elastically deformed in the extending direction (vehicle forward-rearward direction) of the main body part 70 in the belt molding 60, and a reaction force thereof acts on the main body part 70 of the belt molding 60. The direction of the reaction force in this case is a direction along the extending direction of the main body part 70 of the belt molding 60. For that reason, as compared to the case where the reaction force acts in direction orthogonal to the extending direction of the main body part 70 of the belt molding 60 as in the above-described comparative example, a situation in which the main body part 70 does not elastically return to its original state or bending or the like of the main body part 70 is not eliminated does is relatively unlikely to occur. As a result, the formation of the gap causing between the surface of the outer panel 10 on the outside far from the vehicle width center in the vehicle width direction and the belt molding 60 can be suppressed.

In the present embodiment, by making the front edge 16c of the flat part 16 and the inclined surface 94b of the second extending part 94 abut against each other when the belt molding 60 is attached from above, the second extending part 94 can be elastically deformed so as to be located on the front side with the lower end of the first extending part 93 as a fulcrum. The second extending part 94 can be simply elastically deformed so as to be located on the front side, utilizing a force for moving the belt molding 60 downward when an attempt to attach the belt molding 60 is made as described above. For that reason, the attachment work of the belt molding 60 can be simply performed.

Moreover, in the present embodiment, the protrusion 95 of the locking part 92 protrudes upward of the upper surface 16a of the flat part 16 of the outer panel 10. For that reason, the plate-shaped tool 100 is inserted between the outer panel 10 and the main body part 70 of the belt molding 60, so that the protrusion 95 can be moved to the first extending part 93 side (a side opposite to the front edge 16c of the flat part 16). As described above, the second extending part 94 is elastically deformed to the first extending part 93 side, so that the abutment relationship between the tip part 94a of the second extending part 94 and the lower surface 16b of the flat part 16 can be released, and the belt molding 60 can be simply removed.

In addition, the present embodiment can be changed as follows. In the present embodiment, the protrusion 95 of the locking part 92 and the front edge 16c of the flat part 16 abut against each other. However, an applicable embodiment of the present disclosure is not limited to this, and a gap may be formed between the locking part 92 and the front edge 16c of the flat part 16. In addition, it can be said that the locking part 92 and the front edge 16c of the flat part 16 are adjacent to each other when other members are not interposed between the locking part 92 and the front edge 16c of the flat part 16 even when the gap is formed between the locking part 92 and the front edge 16c of the flat part 16.

In the present embodiment, as long as the flat part 16 of the outer panel 10 extends inward toward near the vehicle width center in the vehicle width direction further than the attachment end part 14, the flat part 16 may be in a state of being largely inclined with respect to the horizontal plane. When at least the flat part 16 extends inward toward near the vehicle width center in the vehicle width direction further than the attachment end part 14, the locking part 92 of the end member 90 can be more reliably locked by locking the locking part 92 in the end member 90 to the flat part 16 rather than locking the locking part 92 to the attachment end part 14.

In the present embodiment, the end member 90 includes the shaft part 91 that extends in the vehicle forward-rearward direction and the shaft part 91 of the end member 90 is clamped by the rear end part 76 of the main body part 70. However, an applicable embodiment of the present disclosure is not limited to this. For example, even in a case where the end member 90 does not include the shaft part 91 that extends in the vehicle forward-rearward direction, the end member 90 can be fixed to the main body part 70 by bonding a front surface of the lid part 97 in the end member 90 to the rear end surface of the rear end part 76 in the main body part 70. Additionally, in the case, the end member 90 may include the locking part 92 that protrudes downward from the lid part 97.

In the present embodiment, the end member 90 includes the restricting part 96. However, the restricting part 96 may be omitted. In the present embodiment, the lower lip 78 in the main body part 70 abuts against the surface (upper surface) of the panel body part 15 of the outer panel 10 on the side far from the vehicle width center in the vehicle width direction. However, this abutment may not be omitted. Additionally, the lower lip 78 may be omitted. Even in the case, when the locking part 92 in the end member 90 is locked to the lower surface 16b of the flat part 16 of the outer panel 10, the belt molding 60 can be prevented from deviating upward or coming off upward.

In the present embodiment, the first extending part 93 and the second extending part 94 in the locking part 92 have a substantial V-shape as a whole. However, when the locking part 92 is hook-shaped as a whole and the tip of the locking part 92 can be made to abut against the lower surface 16b of the flat part 16 of the outer panel 10, the shape thereof does not matter. For example, the first extending part and the second extending part may extend in a circular-arc shape and may be formed in a substantial U-shape as a whole. Additionally, for example, the locking part 92 may include a first extending part that protrudes downward perpendicularly to the shaft part 91 from the shaft part 91, and a second extending part that protrudes rearward from a portion of the first extending part in the upward-downward direction. In the case, an upper surface of a tip part of the second extending part may abut against the lower surface 16b of the flat part 16. In addition, in the above-described modification example, it is preferable that a lower surface of the second extending part is an inclined surface located closer to the upper side toward the rear side.

In the present embodiment, the locking part 92 of the end member 90 is adjacent to the front side of the flat part 16 of the outer panel 10. However, a positional relationship between the flat part 16 of the outer panel 10 and the locking part 92 of the end member 90 is not limited to this. For example, the locking part 92 of the end member 90 may be adjacent to the rear side of the flat part 16 of the outer panel 10. In the case, the locking part 92 may, for example, include the first extending part that protrudes obliquely forward toward the lower side, and the second extending part that protrudes obliquely forward toward the upper side from a lower end of the first extending part.

Moreover, the flat part 16 of the outer panel 10 is provided with a through-hole that passes through the flat part in a thickness direction of the flat part such that the locking part 92 of the end member 90 may be inserted through the through-hole. Even in the case, the locking part 92 of the end member 90 may be adjacent to the edge of an opening of the through-hole in the flat part 16.

In the present embodiment, the locking part 92 includes the protrusion 95. However, the protrusion 95 may be omitted. When the possibility of detaching the belt molding 60 from the outer panel 10 is relatively low, harmful effects are relatively small even when the protrusion 95 is omitted.

In the present embodiment, the protrusion 95 protrudes from the front side of the upper surface 94c of the tip part 94a in second extending part 94. However, an applicable embodiment the present disclosure is not limited to this. For example, the protrusion 95 may protrude from a central portion of the second extending part 94 in the vehicle forward-rearward direction.

In the present embodiment, the end member 90 is attached to the rear end part 76 of the main body part 70 in the belt molding 60. However, instead of or in addition to the rear end part 76, the same end member 90 may be provided at an end part of the main body part 70 on the front side of the vehicle.

What is claimed is:

1. A belt molding attachment structure comprising:
    an outer panel that is a panel located on a side far from a vehicle width center of a vehicular door in a vehicle width direction; and
    a belt molding that is attached to the outer panel, wherein:
    the belt molding extends along an upper end part of the outer panel;
    the belt molding includes a main body part, an end member, and a weather strip;
    the main body part has a U-shaped cross-section that clamps the upper end part of the outer panel from both sides in the vehicle width direction;
    the end member is attached to an end part of the main body part in an extending direction of the main body part;
    the weather strip protrudes toward a vehicle width center side in the vehicle width direction from the main body part;
    the outer panel includes a plate-shaped flat part that extends inward toward the vehicle width center side in the vehicle width direction further than the upper end part of the outer panel and is located below the end member in a vehicle upward-downward direction;
    the end member includes a locking part on a lower side in the vehicle upward-downward direction;
    the locking part includes a hook-shaped tip part that protrudes in the extending direction of the main body part;
    the locking part is configured to be elastically deformed in the extending direction of the main body part;
    the locking part is adjacent to at least one of edges of the flat part in the extending directions of the main body part; and
    the tip part of the locking part abuts against a lower surface of the flat part.

2. The belt molding attachment structure according to claim 1, wherein:
    the end member includes a shaft part that extends in the extending direction of the main body part;
    the locking part protrudes from the shaft part;
    the shaft part is clamped by the end part of the main body part;
    the main body part includes a lower lip that protrudes downward in the vehicle upward-downward direction from a lower end of the end part of the main body part on a side far from the vehicle width center; and
    the lower lip abuts against a surface of the outer panel on the side far from the vehicle width center in the vehicle width direction.

3. The belt molding attachment structure according to claim 1, wherein:
    the locking part includes a first extending part and a second extending part;
    the first extending part protrudes downward in the vehicle upward-downward direction;
    the second extending part protrudes obliquely upward in the extending direction of the main body part toward a lower surface of the flat part in the vehicle upward-downward direction from a lower end of the first extending part in the vehicle upward-downward direction; and
    a tip part of the second extending part abuts against the lower surface of the flat part in the vehicle upward-downward direction.

4. The belt molding attachment structure according to claim 3, wherein:
    the second extending part includes a protrusion that protrudes upward the vehicle upward-downward direction further than a location of abutment against the flat part; and
    the protrusion protrudes upward of an upper surface of the flat part in the vehicle upward-downward direction.

5. The belt molding attachment structure according to claim 1, wherein:
    the flat part is spaced apart from the upper end part of the outer panel, and is located rearward from the upper end part of the outer panel in the vehicle.

* * * * *